United States Patent [19]

Durst

[11] 3,907,931

[45] Sept. 23, 1975

[54] HIGH IMPACT TWO-COMPONENT POLYSTYRENE BLENDS

[75] Inventor: Richard R. Durst, Stow, Ohio

[73] Assignee: The General Tire & Rubber Company, Akron, Ohio

[22] Filed: Apr. 29, 1974

[21] Appl. No.: 464,900

Related U.S. Application Data

[63] Continuation-in-part of Ser. No. 215,681, Jan. 5, 1972, abandoned, which is a continuation-in-part of Ser. No. 99,241, Dec. 17, 1970, abandoned.

[52] U.S. Cl. .......... 260/876 B; 260/879; 260/880 B; 260/892; 260/DIG. 32
[51] Int. Cl.² ................... C08L 53/02; C08L 25/06
[58] Field of Search .................. 260/876 B, 876 R

[56] References Cited
UNITED STATES PATENTS

| | | | |
|---|---|---|---|
| 3,429,951 | 2/1969 | Childers | 260/876 B |
| 3,781,383 | 12/1973 | Finestone et al. | 260/876 R |

FOREIGN PATENTS OR APPLICATIONS

| | | | |
|---|---|---|---|
| 1,053,596 | 1/1967 | United Kingdom | 260/876 B |
| 1,457,763 | 9/1966 | France | 260/876 B |

*Primary Examiner*—Wilbert J. Briggs, Sr.

[57] ABSTRACT

A novel class of resins having excellent impact strength, flexural modulus and heat distortion characteristics consists essentially of blends of polystyrene with graded styrene-butadiene AB block copolymers. In each AB block copolymer the weight ratio of total styrene to total butadiene in the A and B segments ranges from about 15:85, preferably 25:75, to about 45:55. The block copolymers are preferably present in an amount sufficient to give a total styrene content, both as homopolymer and copolymer, of about 75 to 90, preferably 80 to 85, weight percent based on the total blend. In the blends of this invention the discontinuous phase made up of the graded block copolymer is present in the form of particles of which at least 70, preferably 85 or more, weight percent have particles diameters in the range of 0.2 to 5 particle as measured by the "Zeiss Particle Size Analyzer".

12 Claims, No Drawings

HIGH IMPACT TWO-COMPONENT POLYSTYRENE BLENDS

CROSS-REFERENCE TO RELATED APPLICATION

This application is a continuation-in-part of U.S. patent application Ser. No. 215,681, now abandoned filed Jan. 5, 1972 as a continuation-in-part of U.S. patent application Ser. No. 99,241, filed Dec. 17, 1970, and now abandoned.

BACKGROUND OF THE INVENTION

Previous efforts to develop a specific group of physical properties in a particular type of polymeric product have shown that the best single properties appear to be promoted in homopolymers and that any attempt to generate a combination of optimum physical properties by the preparation of copolymers from monomers whose homopolymers have a certain desired physical property tend to result in copolymers having a compromise in physical properties. This has been found even with the preparation of block copolymers. Efforts to combine the best features of two or more polymers in blends have usually resulted in products exhibiting discontinuities in properties with changes in proportions of the polymer ingredients, and in many cases the desirable properties of all of the polymer ingredients were lost, especially in blends of homopolymers. While these failures were first attributed to inadequate mixing procedures for dispersing one polymer in another, it now appears that such failures are due almost entirely to the inherent incompatibility of the polymers to be blended.

Various combinations of resinous polymers and rubbery polymers have been tried in efforts to produce new materials having some combination of the desirable properties of the ingredients with a minimum of the undesirable properties of the ingredients. In particular, extensive research has been instituted to develop vinyl aromatic polymer compositions, particularly polystyrene compositions, which have high impact strengths at both room temperature and temperatures at and below 0°F. and which also have good flexural modulus and heat distortion characteristics. Among the combinations which have been tried have been combinations of styrene-type polymers and butadiene-type polymers, especially such combinations using high proportions of styrene polymers to produce tough polystyrene molding compositions.

Block copolymers of the types AB, ABA, $(AB)_n$ and $(AB)_nA$ have been prepared, and in specific systems certain defined block copolymers have been used in combination with polymerized conjugated dienes, polymerized styrene-type monomers and combinations of the two polymers, sometimes with additional ingredients. In the parent application reference has been made to U.S. Pat. Nos. 2,727,878; 2,755,270; 3,429,951; 3,445,543; and 3,449,469; United Kingdom Pat. Nos. 1,092,296; 1,053,596; 1,145,923 and 1,192,471 and French Pat. No. 1,457,763. Other references which should be noted include U.S. Pat. Nos. 3,231,635; 3,251,905; 3,322,856; 3,377,404; 3,441,530; 3,464,850 and 3,476,829; Japanese Pat. No. 27866/71; published Dutch Patent Application No. 03376/66; and United Kingdom Pat. No. 1,120,404.

The subject application is directed particularly to two-component blends in which one component is a polystyrene and the other components is a graded AB styrene-butadiene block copolymer. Of the references set forth above, one of the most pertinent to the subject matter of this application is U.S. Pat. No. 3,429,951 which shows a blend of 75 parts by weight of polystyrene with 25 parts by weight of an AB block copolymer containing 25 weight percent of polymerized styrene and 75 weight percent polymerized butadiene, the combination containing about 81 weight percent of styrene both as homopolymer and copolymer. This reference teaches the necessity of a peroxide cure to achieve the desired properties, but there is a simple disclosure of such a combination which was momentarily free of peroxide in the course of preparation of a combination within the invention of the reference. No properties or utility are taught for the peroxide-free combination. There is no concern for particle size of the discontinuous phase nor is there any criticality taught as to the structure of the block copolymer. The copolymers specifically disclosed appear to be graded AB styrene-butadiene copolymers.

Another reference of note is United Kingdom Pat. No. 1,053,596, which discloses a high impact polystyrene comprising 70 to 95 weight percent of polystyrene and 5 to 30 weight percent of an AB or ABA block copolymer in which the B block is 60 to 98 percent of the copolymer, at least 75 percent of the B block is saturated, the molecular weight of the A block is in the range of 5000 to 40,000 and the molecular weight of the B block is in the range of 30,000 to 200,000. There is no reference to the particle size of the discontinuous phase.

Another high impact polystyrene composition disclosed in United Kingdom Pat. No. 1,145,923 is a blend of 99 to 80 weight percent of polystyrene, 1 to 20 weight percent of polybutadiene and 0.5 to 10 weight percent of a graded AB styrene-butadiene block copolymer containing in combined form from 30 to 90 weight percent of styrene and from 70 to 10 weight percent of the butadiene. There is no reference to the particle size of the discontinuous phase.

French Pat. No. 1,457,763 discloses a combination of 70 to 97 weight percent of polystyrene and 30 to 3 weight percent of a styrene-butadiene copolymer which can be random, pure block or graded block. However, there is no reference to the particle size of the discontinuous phase.

The principal object of this invention is to provide a novel polystyrene composition having high impact strength. Another object is to provide a novel blend of polystyrene with a particular type of styrene-butadiene block copolymer. Another object is to provide such a novel blend which can be prepared by melt mixing under shear as well as by solution blending techniques without a loss in desired properties. These objects as well as others which are apparent from this description are accomplished by this invention.

SUMMARY OF THE INVENTION

This invention consists essentially of blends of polystyrene with graded styrene-butadiene AB block copolymers. These blends can be prepared satisfactorily by solution blending, mill mixing, high-shear blender mixing as in a Banbury blender or any continuous mixer with sufficient attention to thorough mixing of components.

The blends of this invention provide for improvement in some physical properties of the continuous polystyrene-type phase without a significant reduction in the other physical properties. However, this improvement in properties depends largely upon the particle size of the discontinuous phase made up of particles of the graded AB block copolymer. The most effective particles must each have a diameter in the range of 0.2 to 5 microns although particles outside this range still have a detectable effect. Consequently, at least 70 weight percent, preferably 85 or more weight percent, of the discontinuous phase must be present as particles within the recited particle size range. The physical state of the graded AB block copolymers prior to incorporation into the styrene-type polymer is only significant to the degree that it affects the particle size in the finished blend, said size also being directly affected by the amount of shear on the system during blending.

The blends of this invention are particularly useful for high impact polystyrene sheeting as used, for example, in refrigerator interiors and for injection molded parts, e.g., vacuum cleaner housings.

DESCRIPTION OF THE PREFERRED EMBODIMENTS

High impact polystyrene with an excellent balance of properties is produced by blending polystyrenes with graded AB block copolymers in which A represents essentially polymerized styrene, the remainder of said block being polymerized butadiene, and B represents essentially polymerized butadiene, the remainder of said block being polymerized styrene, and the weight ratio of styrene to butadiene in A and B ranges from 15:85, preferably The polystyrene polymers (A) employed in the blends of this invention are polymers consisting essentially of polymerized styrene, preferably styrene homopolymers. The polystyrene polymers can also contain up to about 5 or 10 weight percent of other copolymerized ethylenically unsaturated compounds such as other monovinyl aryl monomers like alpha-methyl styrene, acrylic compounds such as acrylic and metharcylic acid; esters, amides and nitriles on the order of methyl methacrylate, ethyl acrylate, methacrylamide, fumaronitrile and acrylonitrile; cyclic unsaturated compounds such as the nuclear chlorostyrenes, vinyl naphthalene, vinyl carbozole and acenaphthylene; and conjugated unsaturates such as butadiene, isoprene, chloroprene, 2,3-dichlorobutadiene, piperylene and the like. In bulk polymerization these resins are commonly prepared by heating the styrene and any comonomer at temperatures in the range of 100°C. to 200°C., with application of pressure if necessary to confine the monomers. The polymerization can also be carried out at lower temperatures by the addition of free-radical generating peroxidic catalysts such as benzoyl peroxide, acetyl peroxide, di-t-butyl peroxide and the like. The polymerization can also be carried out in suspension to yield a dry powder or in emulsion, usually resulting in a latex of polystyrene, which can be either coagulated to yield the solid powdery polystyrene or used as such for blending with the other constituent in the form of a latex. The polymerization can also be carried out in solution with precipitation of the product, if desired, by standard techniques such as steam-stripping.

The most important variable in the polystyrene constituent is its molecular weight. The polystyrene constituent should have a number average molecular weight between about 50,000 and 500,000 preferably in the range of 100,000 to 300,000.

The graded AB block copolymers (B) which are employed in the blends of this invention are preferably such that A represents essentially polymerized styrene and B represents essentially polymerized butadiene. Graded AB block copolymers differ from pure AB block copolymers of the same molecular weight in that some of the A monomer, generally about 20 percent of the total A monomer, is included in the B block while some of the B monomer appears in the A block. On the other hand, in the pure AB block copolymer the A block is all A monomer while the B block is all B monomer. One manifestation of this fact is the difference in glass transition temperatures between pure block copolymers and graded block copolymers of essentially the same molecular weight. For styrene-butadiene block copolymers the pure block copolymers generally show a glass transition temperature of about −105°C. for the polybutadiene block B and a glass transition temperature of about 105°C. for the polystyrene block A whereas the corresponding graded block copolymers of this invention show a glass transition temperature of about −94°C. ±6°C. for the graded polybutadiene block. By thermal analysis the glass transition temperature of the styrene block in the graded block copolymer of this invention usually cannot be seen, but it is not essential.

In pure block copolymers, the principal or major A block should have a number average molecular weight between 25 and 50 percent of the calculated number average molecular weight of the continuous polystyrene phase. However, in graded block copolymers because of the styrene monomer which is combined in the principally polybutadiene block the calculated polystyrene number average molecular weight of the polystyrene block in the graded block copolymer is closer to between 30 to 70 percent of the calculated number average molecular weight of the continuous polystyrene phase. Thus, with a continuous polystyrene phase having a number average molecular weight of 120,000, each graded A block in the block copolymer should have a calculated number average molecular weight of from 36,000 to 84,000 and will show principal blocks having actual number average molecular weights in the range of about 30,000 to 60,000. For graded block copolymers having A:B ratios between 15:85 and 45:55 the total calculated number average molecular weights can range from about 100,000 to about 375,000. However, it has been found that the graded block copolymer should have a number average molecular weight in the range of 100,000 to 500,000, preferably about 200,000 to 300,000, in the compositions of this invention.

The initial particle sizes of the graded AB block copolymers are not particularly critical in themselves. Of primary concern is the particle size of the discontinuous phase in the final blend. In order to get the optimum balance of properties in the finished blends of this invention with special emphasis on impact resistance, it is necessary that at least 70 percent, preferably 85 percent or more, by weight of the defined and claimed particles in the finished blends of this invention each have a particle diameter in the range of 0.2 to 5 microns. A minor amount, i.e., no more than 30 weight percent, of the particles in any finished blend can be outside the defined size range, but the particles having sizes below the defined range do not improve significantly physical properties of the blend as compared to the polystyrene alone, and the particles having sizes above the defined range tend to have an adverse effect on surface texture of the blends when vacuum-formed, for example, although there is some apparent improvement in physical properties of the blend as compared to the polystyrene phase alone.

It should be noted that processing conditions have a great effect on molecular weight of all components and on particle size of the discontinuous phase. High-shear mixing tends to reduce the particle size of the discontinuous phase. For the purposes of this invention the particle size of the dispersed phase, once reduced below the stated minimums, cannot be corrected. The particle sizes of greatest importance apply to the dispersed particles in the final blended product. Particle size was determined optically or by electron microscopy.

The graded AB block copolymers are prepared generally by mixing the A and B monomers in a solvent such as benzene, hexane or cyclohexane, adding an initiator such as sec-butyl lithium and heating at 30° to 50°C. as is well known in the art. The lithium atoms can be removed, for example, by a protonating agent. The preparation of a suitable graded AB block copolymer is described in Example I below.

The presentation of graded AB block copolymers is shown to be well known in ETUDE DES SYSTEMS TERNAIRES: RESINE-ELASTOMERE-COPOLYMERE SEQUENCE CORRESPONDANT by J. Kohler, G. Riess and A. Banderet, European Polymer Journal, 1968, Volume 4, pg. 173 to 205, Pergamon Press, England.

The polymer blends of this invention consist essentially of polystyrene polymers as described above in amounts of about 64 to 82 weight percent of the total blend. The graded AB type block copolymers are employed in the blends of this invention in amounts of about 36 to 18 weight percent of the total blend.

Particular combinations of the components of these blends within the range may give a particular combination of properties which are desired. The total vinyl aromatic, e.g., styrene, content, both as homopolymer and copolymer, should be in the range of 75 to 90 weight percent of the total blend, preferably from about 80 to about 85 weight percent, in order to achieve optimum balance of impact, flexural and heat distortion characteristics.

Of particular interest are the blends of polystyrene or styrene copolymers containing at least about 90 weight percent of polymerized styrene with graded AB block copolymers as described above in which the monomers employed are styrene and butadiene. Such blends can be prepared by properly melt mixing under shear stress without a significant decrease in physical properties over similar blends prepared in solution systems.

The blends of this invention can be prepared by any of the methods well known in the art as exemplified by the patent references cited above. Melt mixing under shear stress as in Banbury blenders, mills and/or continuous mixers has proved to be successful for the blends of this invention.

The following examples are illustrative of the best methods and alternative methods of preparing the compositions of this invention and are not intended to limit this invention which is properly delineated in the claims. Unless otherwise stated, quantitative measurements are by weight.

EXAMPLE I

The block copolymer S employed in this example was a graded styrene-butadiene AB block copolymer in which A represents essentially a polymerized styrene portion and B represents essentially a polymerized butadiene portion, the total polymerized styrene amounting to 40 weight percent of the graded block copolymer and the total polymerized butadiene amounting to a total of 60 weight percent of the graded block copolymer. The subject block copolymer was prepared in an agitated benzene solution, there being sufficient benzene present at all times to give a solution containing no more than 10 weight percent solids. Styrene monomer was dissolved in benzene at room temperature. Sec-butyl lithium was added slowly until the first hint of light yellow color indicated that all impurities had reacted and would not interfere with the subsequent polymerization. Then sufficient butadiene was added to give the desired 40/60 styrene/butadiene weight ratio. Again sec-butyl lithium was added, this time in an amount calculated to react with any additional impurities without generating polymerization. A catalytic amount of sec-butyl lithium catalyst was then added, and the mixture was heated at 50°C. to produce a copolymer having a number average molecular weight of about 245,000 and comprising a terminal portion rich in polybutadiene and a terminal portion rich in polystyrene. The living copolymer was deactivated or killed by the addition of isopropanol until the solution became colorless. An antioxidant (2,6-di-t-butyl-para-cresol) was added as an isopropanol solution of 0.01 gram of the antioxidant per milliliter of isopropanol such that there was about 1 weight percent antioxidant based on the initial weight of the butadiene.

It is now preferable to prepare each of the subject graded block copolymers by the following steps:

1. dissolving styrene monomer and butadiene monomer in hexane in amounts to give the desired styrene/butadiene weight ratio and to give a solution containing about 15 weight percent solids, 2. heating the solution to 150°F., 3. slowly adding a one percent solution of n-butyl lithium in n-hexane at 150°F. until there is a slight exotherm indicating that all impurities had reacted, and then 4. adding the catalytic amount of sec-butyl lithium and heating at 150°F. for about 4 hours to obtain the desired copolymer which is deactivated as described above, and an antioxidant is added.

The graded AB block copolymer solution can be used for solution blending or the solvents can be steam-stripped leaving the graded AB block copolymer as a fine crumb for milling, blending or other solid state mixing procedure.

Block copolymer S in benzene solution at 30°C. was solution blended with a commercial polystyrene having a number average molecular weight of 120,000 in amounts to give a blend containing 66.7 weight percent of the pure polystyrene and 33.3 weight percent of the block copolymer S. The total styrene content of the polyblend was 80 weight percent. The block copolymer was present in the form of particles at least 70 weight percent of which had diameters in the range of 0.2 to 5 microns. The polymer blend is best isolated by adding the benzene solution to agitated isopropanol. Precipitation of the polymer blend takes place. The resulting white polymer blend is then dried in a vacuum oven at 50°C. to a constant weight.

Test specimens of the polymer blend were prepared by placing the polymer blend between two plates coated with polytetra-fluoroethylene and heating to 370°F. for 1 minute to change the polymer blend into a fused disc which was cut into strips and compression molded at 370°F. for 10 minutes at 20,000 psi on a 4-inch ram into test bars 2.5 × 6 × 0.125 inches and 1.125 × 6 × 0.125 inches. Test specimens were cut from the test bars and were used in a number of tests including determination of flexural modulus by ASTM physical test method 2418, determination of notched Izod impact strength, and determination of heat distortion temperature (°C.) when test specimens had deflected 10 mils and 60 mils at an applied load of 264 psi.

The test specimens showed a flexural modulus of 216,000 psi, notched Izod impact strength of 10.2 ft.-lbs./inch notch, 10 mil deflection at 88°C. and 60 mil deflection at 98°C. By comparison, similarly prepared test specimens of a commercial "high impact" polystyrene and a commercial "high flexural modulus" polystyrene showed flexural moduli of 227,000 and 382,000 psi respectively, notched Izod impact strengths of 1.60 and 1.15 ft.-lbs./inch notch respectively, 10 mil deflection at 79°C. and 75°C. respectively, and 60 mil deflection at 88°C. and 84°C. respectively.

EXAMPLE II

A polymer blend was prepared according to the method of Example I except that the final blend contained 75 weight percent of the pure polystyrene and 25 weight percent of the graded block copolymer S resulting in a total styrene content in the polymer blend of 85 weight percent. Again, the block copolymer formed particles at least 70 weight percent of which had diameters between 0.2 and 5 microns.

Test specimens of this blend prepared and tested according to the methods described in Example I showed a flexural modulus of 285,000 psi, a notched Izod impact strength of 6.2 ft.-lbs./inch notch, 10 mil deflection at 88°C. and 60 mil deflection at 95°C.

EXAMPLE III

Graded block copolymers T and U were prepared in the same way as block copolymer S in Example I except that the weight ratios of styrene to butadiene were 25:75 and 20:80 respectively instead of 40:60 and the number average molecular weights were about 280,000 and 300,000 respectively.

Polymer blends were prepared according to the method described in Example I using block copolymers T and U and the commercial polystyrene employed in Example I, the total styrene content in each polymer blend being 80 weight percent. In each case the block copolymer formed particles at least 70 weight percent of the which had diameters in the range of 0.2 to 5 microns.

Test specimens of these blends prepared and tested according to the methods described in Example I showed the properties shown below.

TABLE

| Blend | III-A | III-B |
|---|---|---|
| Block Copolymer | T | U |
| Weight percent of | | |
| Polystyrene | 73.3 | 75 |
| Block Copolymer | 26.7 | 25 |
| Flexural Modulus (psi) | 201,000 | 221,000 |
| Notched Izod Impact | | |
| (ft.-lbs./inch notch) | 7.9 | 6.2 |
| Heat Distortion Temp. (°C.) | | |
| 10 mil | 91 | 93 |
| 60 mil | 99 | 99 |

EXAMPLE IV

When polymer blends like the blend from Example II are prepared by mill mixing the components for 10 minutes at 325°F. in the absence of solvent, the block copolymer is present primarily in the form of particles at least 70 weight percent of which have diameters in the range of 0.2 to 5 microns, and test specimens of this polymer blend prepared and tested according to the methods described in Example I show similar excellent flexural moduli notched Izod impact strengths and heat distortion values.

Compounds of this invention are of particular interest because of their excellent properties at low temperature as well as at room temperatures. For example, polymer blends of this invention maintain an excellent balance of physical properties including having excellent notched Izod impact strengths at 0°F. and −40°F. In fact, the notched Izod impact strengths of the polymer blends of this invention at −40°F. are as good as or better than the room temperature impact strengths of commercially available high impact polystyrene. Generally, it has been found that for the preferred polymer blends of this invention the impact strengths at 0°F. and −40°F. are about one-half and about one-third respectively of the impact strengths at room temperature.

Miscellaneous additives such as pigments can be included in the blends of this invention.

The compositions of this invention, like previously known high impact polystyrenes, are of particular use for toys and refrigerator linings.

For the purposes of this invention, the discontinuous phase is dispersed in the continuous phase or matrix as particles at least 70 weight percent of which have particle diameters in the range of 0.2 to 5 microns as measured by the "Zeiss Particle Size Analyzer". This analyzer and its use is described in "New Techniques of Particle Analysis" by D. W. Montgomery in *Rubber Age*, February 1964.

I claim:
1. A composition characterized by exhibiting excellent properties such as impact strength at low temperatures as well as room temperatures, said composition consisting essentially of a blend of
   A. a matrix of polymers prepared from at least 90 weight percent styrene monomer, any other monomers being other ethylenically unsaturated monomers, said polymers having a number average molecular weight of from about 50,000 to 500,000; and
   B. graded block copolymers of the type AB in which A represents essentially polymerized styrene, the balance of said segment being polymerized butadiene, and B represents essentially polymerized butadiene, the balance of said segment being polymer- ized styrene, the weight ratio of total styrene to total butadiene in A and B being in the range of 15:85 to 45:55, the number average molecular weight of said block copolymers being from 100,000 to 500,000, said graded block copolymers having a principal glass transition temperature of about −94°C. ±6°C.;

component (B) being dispersed in component (A) as a discontinuous phase of particles of which at least 70 weight percent have diameters in the range of 0.2 to 5 microns and the total styrene units in components (A) and (B) being from 75 to 90 weight percent of the total units in said components.

2. A composition in accordance with claim 1 wherein the polymers in component (A) have a number average molecular weight of 100,000 to 300,000 and the copolymers in component (B) have a number average molecular weight of 200,000 to 300,000 and a weight ratio of styrene to butadiene of at least 25:75.

3. A composition in accordance with claim 2 wherein component (A) consists essentially of polystyrene.

4. A composition in accordance with claim 3 wherein component (B) is present in an amount such that the total polymerized styrene content is from 80 to 85 weight percent of the total blend.

5. A method of making resins having excellent impact strengths, flexural moduli and heat distortion characteristics, particularly at low temperatures, comprising blending a mixture consisting essentially of A. a matrix of polymers prepared from at least 90 weight percent vinyl aryl monomers, any other monomers being other ethylenically unsaturated monomers, said polymers having a number average molecular weight of from about 50,000 to 500,000; and B. graded block copolymers of the type AB in which A represents essentially polymerized styrene, the balance of said segment being polymerized butadiene, and B represents essentially polymerized butadiene, the balance of said segment being polymerized styrene, the weight ratio of total styrene to total butadiene in A and B being in the range of 15:85 to 45:55, the number average molecular weight of said block copolymers being from 100,000 to 500,000, said graded block copolymers having a principal glass transition temperature of about −94°C. ±6°C.;

component (B) being dispersed in component (A) as a discontinuous phase of particles of which at least 70 weight percent have diameters in the range of 0.2 to 5 microns and the total styrene units in components (A) and (B) being from 75 to 90 weight percent of the total units in said components.

6. A method in accordance with claim 5 wherein the mixture is blended in a mutual solvent and precipitated from said solvent.

7. A method in accordance with claim 5 wherein the mixture is blended by heating at a temperature of at least 310°F.

8. A method in accordance with claim 5 wherein the polymers in component (A) have a number average molecular weight of 100,000 to 300,000 and the copolymers in component (B) have a number average molecular weight of 200,000 to 300,000 and a weight ratio of A to B of at least 25:75.

9. A method in accordance with claim 8 wherein component (A) consists essentially of polystyrene.

10. A method in accordance with claim 9 wherein component (B) is present in such an amount that the total polymerized styrene content is from 80 to 85 weight percent of the total blend.

11. A composition in accordance with claim 3 wherein component (B) is dispersed in component (A) as a discontinuous phase of particles of which at least 85 weight percent have diameters in the range of 0.2 to 5 microns.

12. A method in accordance with claim 9 wherein component (B) is dispersed in component (A) as a discontinuous phase of particles of which at least 85 weight percent have diameters in the range of 0.2 to 5 microns.

* * * * *